Sept. 26, 1961 H. H. EMKER ET AL 3,002,052

PARTY LINE KEYING CIRCUIT

Filed April 2, 1959 2 Sheets-Sheet 1

Inventors
Henry H. Emker
& George L. King
By Rudolph J. Jurick
Attorney

Sept. 26, 1961 H. H. EMKER ET AL 3,002,052

PARTY LINE KEYING CIRCUIT

Filed April 2, 1959 2 Sheets-Sheet 2

Inventors
Henry H. Emker
George L. King.
By Rudolph J. Jurick
Attorney

United States Patent Office 3,002,052
Patented Sept. 26, 1961

3,002,052

PARTY LINE KEYING CIRCUIT

Henry H. Emker, Pompton Plains, and George L. King, Morris Plains, N.J., assignors to Radio Frequency Laboratories, Inc., Boonton, N.J., a corporation of New Jersey Filed Apr. 2, 1959, Ser. No. 803,686
9 Claims. (Cl. 178—66)

This invention relates to a teleprinter system of the frequency shift type and more particularly to a party line keying circuit arrangement for use therein whereby such frequency shift type system is made adaptable for party line use.

In teleprinter systems of the type to which this invention is directed, the various characters, figures, punctuation marks, etc., are represented by a succession of wave pulses having a precise time duration, all in accordance with a radiotype code. The time duration of each wave pulse and the spacing therebetween are of the order of milliseconds, and it is common practice to designate one current pulse as a Mark signal and the other a Space signal. The signals are generated by telegraph transmitters and transmitted over any desired communication link, such as, telephone lines, microwave links, power line carrier systems, or the like, to receiving printers. The coded Mark and Space signals are distinguished at the receiver printer, such that generally, only the Mark signals are effective to cause operation of the printer selector magnet mechanism and bring about the power operation of the type bar corresponding to the particular received code character.

Any one of a various number of methods for designating the Mark and Space conditions may be used in teleprinter systems. In amplitude modulation methods, such as on-off keying systems, the transmitter normally sends a current of fixed value and sign to the line during a Mark period and zero current during a Space period (although these conditions may be reversed, if desired). In a party-line system (wherein a plurality of stations, each station comprising transmitter and receiver terminals and a teleprinter, are interconnected through a suitable two wire connecting link, for example), it is possible for all stations to receive the information sent by any one station when the above on-off system is employed. Also, it is possible for any one of the receiving stations to "break" the message being typed on the sending printer when necessary or desired. If a carrier frequency connecting link is used between stations, all the transmitters are tuned to a single carrier frequency, and all receivers are made responsive to the frequency. To function, it is required that the carrier signal be on the system only during the time that a station is transmitting information, and that at all other times there be no carrier present, and all printers be in a Mark-Hold or stand-by condition. This is simply accomplished in an on-off carrier system by using the carrier-off condition as Mark and the carrier-on condition as Space.

In frequency shift systems, a carrier is shifted to a frequency above its center-band frequency for a Mark function and to a frequency below center for a Space function. For a two station system, one carrier frequency channel may be used for each direction of communication wherein different transmitting tones are transmitted in each direction with the input of each equipment filtered to accept only the tones originating at the remote transmitting printer and to reject tones of its own local transmitter. By the use of suitable circuit arrangement, the above-mentioned desirable operational feature of being able to "break" the message being typed on the sending printer is obtained.

It will be readily apparent, however, that a party line arrangement employing frequency shift type equipment wherein each station transmitter and receiver is tuned to the same carrier frequency channel would be inoperative if each transmitter within the system transmitted to the connecting link a carrier frequency for the Mark or stand-by condition, since the transmission of a Space signal by any of the transmitter terminals would be overridden by the other Mark signals on the line, or connecting link. By use of the party line keying circuit of our invention at each station, party line facilities in a frequency-shift type system is possible.

Briefly, with the use of our novel keying circuit, no carrier signal is transmitted by any of the stations and all printers are maintained in a Mark-Hold condition due to receiver discriminator action, during stand-by. When the key board of any one printer is actuated, the frequency shifted carrier is transmitted to all other stations and operates the printers thereof. Carrier transmission is made to cease a short time interval after operation of the sending printer key-board is discontinued.

The novel party line keying circuit of our invention is suited for use in either half duplex or full duplex teleprinter systems, and in both systems the circuit functions to place the transmitter carrier on the line at the start of the first pulse from the printer D.-C. loop, and to remove the carrier from the line at the end of a time interval after the last character has been typed. When used in a half-duplex arrangement, the party line circuit also functions to mute the receiver during the time the local transmitter is on the line. This muting function is necessary in a half-duplex (e.g. two-wire) system since all of the transmitters and receivers are tuned to the same carrier frequency and each receiver is vulnerable to its local transmitter in the sense that if the receiver provides an output upon energization of its transmitter, it will disrupt local teleprinter copy. Disruption of the local copy results from the fact that each station includes a D.-C. loop circuit comprising both receiving and transmitting contacts in series which cannot operate synchronously due to time delay in the transmission of the transmitted signal to the adjacent receiver around the carrier loop. For this reason, the receiver is muted, by maintaining the receiver output relay contacts in closed condition, during transmission by the local transmitter; the receiver relay being responsive at all other times to the remote transmitters. It will be apparent that with the receiver muted, the receiving printer, or printers, cannot "break" the sending printer copy.

In the full-duplex system, wherein the carrier signal communication link is maintained on a four-wire basis, such as a micro-wave system, the input of the carrier receiver and the output of the carrier transmitter are isolated from each other. Therefore, the individual receiver is not vulnerable to its adjacent transmitter, and muting of the receiving relay is unnecessary. Since all of the teleprinters, including the one which is used for sending, are responsive at all times only to the remote transmitters, the four-wire application permits the use of the "break" feature.

I will be understood, then, that party-line operation of the teleprinters of the frequency shift carrier type with our novel keying circuit involves two principles of carrier modulation, frequency shift and amplitude modulation. When all of the printers are in a stand-by condition, no carrier signal is present on the communication circuit. A space frequency pulse is first applied to the circuit upon closure of any one of the teleprinter keying contacts, and since this represents a transition from no-carrier frequency to a carrier-on condition, it is amplitude modulation of the carrier. All succeeding Mark-Space transitions in the first transmitted character, as well as those following in the continuity of the printed message are on a frequency shift basis since the carrier is shifted in frequency for transmission of the Mark-Space coding.

An object of this invention is the provision of a keying circuit for use in a teleprinter system of the frequency shift type, which keying circuit serves to place the carrier on the communication line upon initial actuation of the printer key-board and to remove the carrier from the line a short time after operation of the said sending printer key-board is discontinued.

An object of this invention is the provision of a keying circuit for use in a teleprinter system of the frequency shift type, which keying circuit serves to place the carrier on the communication line upon initial actuation of the printer key-board and to remove the carrier from the line a short time after operation of the said sending printer key-board is discontinued.

An object of this invention is the provision of a novel party line teleprinter system which operates on a combination of frequency shift modulation and amplitude modulation, the carrier frequency energy being cut off during stand-by periods of the printers.

An object of this invention is the provision of a novel receiver muting circuit for use in a teleprinter system, which circuit serves to maintain the receiver relay contacts in closed condition during the transmitting operation of the local transmitter.

An object of this invention is the provision of a party line teleprinter system which includes a circuit for muting the receiver while the local transmitter terminal is energizing the communication line.

An object of this invention is the provision of a novel party line circuit which functions to place the transmitter carrier energy on the line at the start of the first pulse from the D.-C. teleprinter loop, remove the carrier from the line at the end of a predetermined and adjustable time interval after the last character has been typed on the teleprinter, and mute the receiving relay during the time the local transmitter carrier is on the line.

An object of this invention is the provision of an alternating current telegraph system having a transmitter comprising a continuously operative source of marking and spacing signal frequencies, a normally disabled means connecting the transmitter to a communication link, a telegraph signal generator for controlling the said source of signal frequencies, and keying means responsive to the said telegraph signal generator for enabling the said normally disabled connecting means.

An object of this invention is the provision of an alternating current telegraph system having a transmitter comprising a source of marking and spacing signal frequencies, a normally responsive signal frequency receiver, a telegraph signal generator for controlling the said source of signal frequencies, a telegraph selector magnet responsive to the telegraph signal generator and to the receiver, and a keying circuit responsive to the telegraph signal generator for muting the receiver during generation of telegraph signals by the said telegraph signal generator.

These and other objects and advantages will become apparent from the following description when taken with the accompanying drawings illustrating the invention. It will be understood, however, that the drawings are for purposes of illustration and are not to be construed as defining the scope or limits of the invention, reference being had for the latter purposes to the claims appended hereto.

In the drawings wherein like reference characters denote like parts in the several views.

Figures 1, 2:
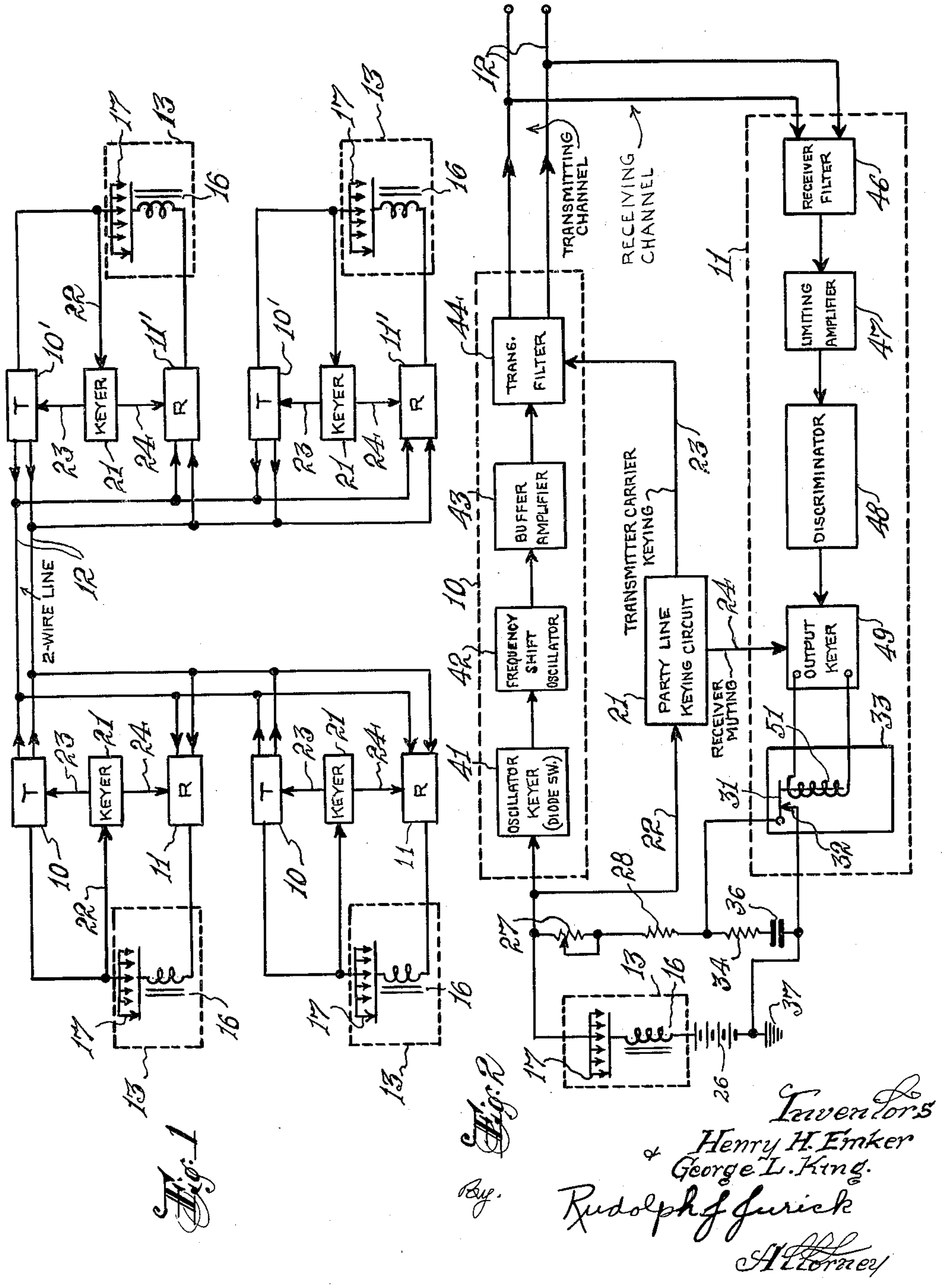
FIGURE 1 is a block diagram of a half-duplex, two wire, party line communication system employing teleprinters and our novel party line keying circuit.
FIGURE 2 is a detailed block diagram of one of the party line stations shown in FIGURE 1.

Reference is first made to FIGURE 1 wherein therein is shown a block diagram of a party line communication system which includes two (2) pairs of transmitters 10 and receiver terminals 11 interconnected by a two wire line 12 to two remote pairs of transmitter and receiver terminals which are identical with terminals 10 and 11 but which, for sake of clarity, are designated 10' and 11', respectively. Although a total of four (4) stations are shown in FIGURE 1, it will be understood that our invention is not limited to party line systems employing four stations, since any number of stations may be used in the system. Each station includes a teleprinter 13 comprising a series connected printer selector magnet 16 representating a telegraph receiver recorder and key contacts 17. The actual printers are of well-known conventional construction with the key contacts normally closed until a key of a finger-operable keyboard (not shown) is depressed, as in typing. The selector magnet 16 and key contacts 17 of each station are included in a D.-C. teleprinter loop circuit which include also a series connected source of D.-C. potential. The transmitters are keyed by telegraph signal voltage pulses from the associated teleprinter loop circuit upon actuation of the teleprinter key board. The selector magnet, or recorder, is operated upon actuation of the key board (not shown) and also by the associated receiver output upon receipt of input signals to the receiver from remote transmitters. During transmission of a message by the printer, the printer keys of the finger-operable keyboard are depressed one at a time by the operator whereupon the associated mechanism (not shown) opens the one normally closed contact for the full time a character is being sent, while the other contacts make and break in accordance with a teleprinter code. While receiving, the one contact remains closed, as illustrated and only the selector magnet armature (not shown) operates, as is well known.

The transmitters and receivers, for the two-wire party line arrangement are all tuned to the same frequency channel, preferably in the audio range, with the Mark function being represented by a 977.5 cycle per second tone and the Space function by a 892.5 cycle per second tone, for example. It will be apparent that if during stand-by condition all the transmitters were transmitting a Mark-Hold signal to the line 12, the transmission of a Space signal by any one of the transmitters upon actuation of a printer key on the associated teleprinter would be of no avail since such Space signal on the line would be overriden by the mark signals from the other transmitters. Party line operation is made possible by use of our novel party line keying circuit, designated 21, at each of the stations, which circuits are energized by an output from the associated teleprinter loop circuit (as are the transmitters) through leads designated 22. The keying circuits 21 are connected to the associated transmitters through leads 23, and function to place the transmitter output carrier on the line 12 at the start of the first space pulse from the associated teleprinter loop circuit and to remove the carrier from the line a short time interval after the end of the message being typed on the teleprinter.

Since all of the transmitters and receivers are tuned to the same channel frequency, it will be apparent that each receiver is vulnerable to the output from its associated transmitter in the illustrated two-wire party line system of FIGURE 1. Because of an inherent delay between the time the message is typed at the teleprinter and received at the receiver output, the series connected transmitting and receiving contacts of the teleprinter would not operate synchronously, and the local copy would be disrupted. To prevent disruption of the local copy, the keying circuits 21 are connected through leads 24 to the associated receivers and provide a signal to a relay in the receiver output during the time the associated transmitter carrier is on the line to thereby mute the receiver.

It will be understood that with the two-wire party line system illustrated in FIGURE 1, the receiving printers are unable to "break" the sending printer since the receiver associated with the sending transmitter is muted. In a full-duplex party line system, wherein the communication link is maintained on a four-wire basis, as in a microwave system, for example, the input to the receiver and output to the transmitter of each individual station are isolated from each other. Therefore, each individual receiver is not vulnerable to its adjacent transmitter and muting of the receiver relay is not required. It will be understood, however, that in such a full-duplex system, the novel party line keying circuit of our invention is used to key the transmitter carrier but not to mute the receiver upon transmission by its associated transmitter. With a four-wire application, the sending printer can be disrupted by any of the receiving printers at the opposite end of the communication link.

Figure 3:
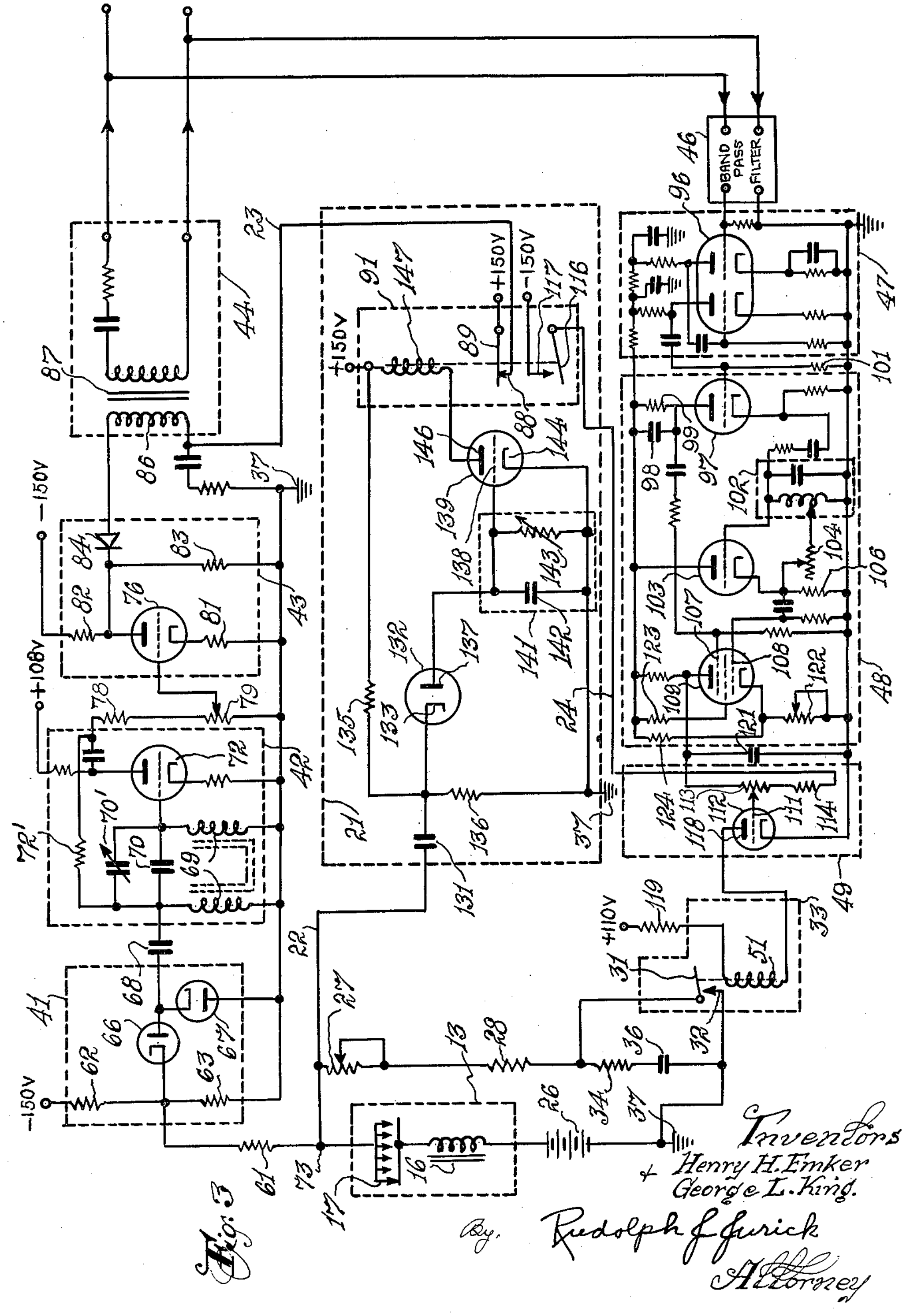
FIGURE 3 is a semi-diagrammatic illustration of the station shown in FIGURE 2.

Reference is now made to FIGURES 2 and 3 of the drawings wherein there is shown a block diagram and a semi-schematic diagram, respectively, of one of the telegraph stations shown in FIGURE 1. The printer selector magnet 16 and key contacts 17 of the teleprinter are in series circuit arrangement with a D.-C. voltage source, such as the battery 26. In addition to the teleprinter 13 and battery 26, the D.-C. teleprinter loop circuit includes a series connected potentiometer 27, current limiting resistor 28 and the contacts 31 and 32 of the receiver telegraph relay 33. A series connected resistor 34 and capacitor 36 are connected across the receiver relay contacts. The negative side of the battery 26 and the stationary relay contact 32 are connected together and to the common ground connection, designated 37. During stand-by condition the D.-C. teleprinter loop circuit is closed, i.e., the telegraph keys and the receiver relay contacts are in a closed condition. The key contacts 17 (together with above-mentioned mechanism, not shown, for opening and closing the contacts in accordance with a teleprinter code upon actuation of a key of the teleprinter keyboard) and the D.-C. source 26 comprise a telegraph signal generator for controlling the transmitter frequency and the party line keying circuit in a manner described in detail hereinbelow.

Referring, specifically, to FIGURE 2, it will be seen that the D.-C. teleprinter loop is connected to the carrier frequency transmitter 10, which transmitter includes an oscillator keying circuit 41 (comprising a diode switch or clamping circuit, for example) connected to a frequency shift carrier oscillator 42. The output from the frequency shift oscillator comprises either a Mark signal tone of one frequency when the teleprinter key contacts 17 are closed, or a Space signal tone of a second frequency when the teleprinter key contacts 17 open the D.-C. loop circuit. The oscillator output terminals are connected through a buffer amplifier 43 and band pass filter 44 to the communication link 12.

In the half-duplex party line system illustrated in the drawings, the input for the receiver 11 is obtained from the communication link 12. As seen in FIGURE 2, the receiver, which may be of any conventional design, comprises a receiver band pass filter 46 tuned to the same carrier frequency channel as the transmitter band pass filter 44. The filtered signals from the communication link passing through the receiver band pass filter are applied to a limiting amplifier 47 which may be of conventional design and utilizing, for example, several resistance-capacitance coupled stages, each operating as a limiting amplifier stage. To permit the amplifier to operate at the greatest possible telegraph transmission speed, while maintaining a minimum difference of level between marking and spacing carrier frequencies, the time constants of the R-C coupling networks between stages are no greater than the period of the lowest carrier frequency employed. The limited signals are then applied to a tuned discriminator 48 which may be of conventional design and which functions to convert the Mark signals to positive D.-C. voltages and Space signals to negative D.-C. voltages. These D.-C. signals are applied to an output keyer 49; the output of which keyer is connected to the relay control winding 51 of the receiver telegraph relay 33. It will here be understood that the relay contacts are normally maintained in the open position in the unenergized condition of the relay, by any suitable biasing means not shown in the drawings; the contacts being closed upon energization of the control winding. In a manner described in detail below, the positive D.-C. voltage (Mark signal) from the discriminator 48 produces a maximum conduction of the output keyer 49; the resultant output current therefrom flowing through the control winding 51 and energizing the relay to close the contacts thereof. The discriminator circuit 48 is adjusted such that when no signal is applied to the receiver input, the discriminator produces a positive voltage (Mark function) whereby the output from the output keyer 49 energizes the relay to maintain the contacts thereof closed. When a Space signal is applied to the receiver input, the resulting negative discriminator output cuts off the output keyer 49 which, in turn, removes the energizing potential from the relay control winding, whereby the relay contacts return to the normal open condition.

The novel party line keying circuit 21 of our invention is connected through the lead 22 to the D.-C. teleprinter loop and is provided, therefore, with the same telegraph signal input pulses which are supplied to the input of the transmitter 10. The output lead 23 from the party line keying circuit 21 is connected to the transmitter band pass filter 44 and, as described in detail below with reference to FIGURE 3, serves to place the carrier frequency signal from the frequency shift oscillator 42 on the communication line 12 at the initiation of a message at the teleprinter 13, and to remove the same from the line a short interval of time after operation of the teleprinter keyboard. The second keying circuit output lead 24 is connected to the input of the output keyer 49 and, under stand-by conditions and during the time the receiver is receiving signals from a remote station, the party line keying circuit 21 supplies a suitable bias potential to the keyer 49 for normal operation thereof. However, at the initiation of a message at the adjacent teleprinter, the bias potential supply from the party line keying circuit is removed from the output keyer 49, whereby the keyer conducts sufficiently to maintain the relay 33 energized (relay contacts 31, 32, closed) whether the receiver input signal is a Mark or a Space function. The receiver relay 33 is thereby muted (i.e. unresponsive to receiver input signals from the adjacent transmitter and remote transmitters) during operation of the associated teleprinter, and for a short time interval after operation of the said teleprinter.

Reference is now made to FIGURE 3 of the drawings wherein the transmitter terminal 10, receiver terminal 11, and party line keying circuit 21 are shown schematically. The D.-C. teleprinter loop is shown connected through a coupling resistor 61 to the input of the oscillator keyer 41, which keyer circuit includes a pair of series connected resistors 62 and 63 forming a voltage divider network between a negative 150 volt supply and the common ground 37. Series and shunt connected keying diodes 66 and 67, respectively, are connected between the junction between the voltage divider resistors 62 and 63 and the common ground 37. The junction between the diodes (i.e., the junction between the plate of diode 66 and cathode of diode 67) is connected through a capacitor 68 to a tuned oscillator circuit which includes an inductor 69, capacitor 70, and a trimmer capacitor 70'. The tuned oscillator circuit is included in a feedback oscillating type circuit which includes a triode tube 72 and feedback resistor 72'. With the printer keyboard contacts 17 closed, the positive D.-C. voltage of the D.-C. source 26, minus the relatively small drop across the selector magnet 16, is applied to the point designated 73 in the D.-C. printer loop. For purposes of description, the D.-C. source 26 may be a 120 volt battery, for example. The positive voltage from the D.-C. teleprinter loop is supplied through the coupling resistor 61 to the keying diodes 66 and 67, and the diodes are thereby reverse biased to a non-conducting state. With the diodes non-conducting, the capacitor 68 is effectively removed from the oscillator circuit, and the oscillator generates a Mark signal. When the printer keyboard contacts 17 are opened, during sending operations, the positive potential of the battery is removed from the input to the oscillator keyer, and the negative 150 volt potential through the voltage divider network of the resistors 62 and 63 provides a negative, forward, bias on the keying diodes 66 and 67, thereby causing the diodes to conduct. The capacitor 68 is thus clamped to ground potential through the diode 67 thereby placing the said capacitor in the tuned oscillator circuit and shifting the frequency of the said circuit to a Space frequency signal.

It will here be noted that in choosing the value of the D.-C. coupling resistor 61, two factors must be considered. First, negative inductive voltage transients from the selector magnet 16, when the D.-C. teleprinter loop is keyed by the relay 33, must not lower the positive reverse bias on the oscillator keyer diodes to a point where the transmitter can shift momentarily to a Space frequency. Secondly, the selector magnet, when the relay contacts are open (Space condition) must have a value of current as near zero as possible. A low value of resistance for the resistor 61 will satisfy the first requirement, and a high value is required in the second case. Consequently, a compromise in resistance values must be made. For a 120 volt D.-C. supply 26, a coupling resistor value of between 56K to 100K ohms has been found to be satisfactory.

The Mark and Space signals from the frequency shift oscillator 42 are applied to the input of the buffer amplifier 43 comprising, for example, a triode electron tube 76; the oscillator output being coupled from the anode of the oscillator tube 72 through a capacitor 77, resistor 78 and potentiometer 79 to the control grid of the buffer amplifier tube 76. The cathode of the buffer amplifier tube is connected to the common ground through a resistor 81, while the anode thereof is connected through a resistor 82 to a 150 volt source of negative supply potential. The resistor 82, together with a series connected resistor 83, form a voltage divider network between the negative 150 volt supply potential and the common ground.

The anode of the buffer amplifier tube 76 is also connected through a blocking diode 84 and primary winding 86 of a transformer 87, in the transmitter band-pass filter 44, to the lead wire 23 from the party line keying circuit 21. For present purposes of description of the transmitter operation and before describing the party line keying circuit 21 in detail, it will here be noted that the lead wire 23 is connected through relay contacts 88 and 89 of a relay 91 in the party line keying circuit to a positive 150 volt source of potential. It will here be understood that the relay contacts 88, 89 are normally maintained in the closed position, and the relay contacts 116 and 117 in the open position in the unenergized condition of the relay, by any suitable biasing means not shown in the drawings. With the relay contacts 88, 89 in the normal closed condition, as illustrated, a positive anode potential is supplied to the buffer amplifier tube, and the carrier frequency signals from the oscillator are fed through the buffer amplifier 43 and band pass filter 44 to the communication line 12. In the open condition of the relay contacts 88, 89 the positive D.-C. supply potential is removed from the buffer amplifier tube anode, and the amplifier is disabled and ceases to function. Upon removal of the positive 150 volt supply potential from the lead 23, the diode 84 acts as a high impedance thereby preventing signal feed through from the oscillator 42 to the transmitter band pass filter and communication circuit by way of the electric capacities of the buffer amplifier tube 76. It will be understood, then, that the transmitter carrier signal is placed on the communication circuit when the relay contacts 88, 89 are in the normal closed position with the relay 91 deenergized, and is removed from the communication circuit when the relay contacts 88, 89 are opened, upon energization of the said relay. As will be further understood from the detailed description of the party line keying circuit hereinbelow, the relay 91 is energized (contacts 88, 89 opened) during stand-by condition and when the adjacent receiver is receiving signals from a remote transmitter, and is deenergized (relay contacts 88, 89 closed) during actuation of the keyboard of the adjacent teleprinter. A series connected filter capacitor 92 and resistor 93 are included between the lead wire 23 and common ground potential.

In FIGURE 3, the receiver band-pass filter 46 is shown in block diagram form and may be of well known construction and design, the filter serving to separate the desired carrier frequency from all other carrier channel frequencies which may be present on the communication line 12. If, therefore, none of the transmitters in the party line system are transmitting, no signal is passed through the filter 46. Upon transmission of a carrier frequency signal by any of the system transmitters, the signal is passed through the filter 46 and impressed upon the control grid of a double triode vacuum tube 96, which, together with the associated circuitry, constitutes the limiting amplifier 47. The output signal from the amplifier 47 is applied to the control grid of the electron tube 97, which is arranged as a cathode follower and phase shifter with the impedance of the load capacitor 98 (as an example of a phase-shifting impedance) approximately 10,000 ohms at the carrier frequency. This capacitor is in shunt with the biasing resistor 99 between the positive side of the 150 volt supply and the anode of the tube 97. The grid of the tube 97 is biased by the resistor 101. It will be apparent that the voltage across the capacitor 98 leads the voltage at the cathode by 90 degrees. The cathode voltage is applied through a D.-C. blocking capacitor and driving resistor to a tuned circuit 102 comprising a shunt capacitor and coil. Since, in the audio range, the Q of the inductance coil of the tuned circuit generally is not sufficiently high for narrow band operation, the Q is increased, and correspondingly the overall sensitivity of the circuit, by means of the electron tube 103 which is arranged to regeneratively feed back energy into the tuned circuit, the amount of energy so fed back being controlled by the value of the resistor 104.

The voltages across the capacitor 98 and across the cathode resistor 106 of the tube 103 are respectively applied to the control grids 107 and 108 of the tube 109, the anode of which tube is connected to the positive side of the 150 volt supply through a plate load resistor. The tube 109 is a gated beam type (6BN6, e.g.) which has a high transconductance between each control grid and the anode. Consequently, both grids exercise a high degree of control over the flow of the electron stream through the tube. Each grid can switch the plate current between cut off and its limited value with only a relatively low applied grid signal. When alternating current signals are applied to the control grids 107, 108 each grid will tend to throw the tube into a condition of complete cut off or complete conduction in accordance with the instantaneous signal polarities. Inasmuch as either grid can cut off the flow of plate current, the tube will conduct only during that portion of each cycle for which the two grids are positive at the same time. By varying the relative phase of the grid signals the length of time that the tube conducts can be varied. When the frequency of the input signal is less than the resonant frequency of the tuned circuit 102 (a Space signal) the voltages applied to the two control grids of the tube 109 are relatively in phase and a maximum plate current will flow in the tube anode circuit and, conversely, when the input signal frequency is above the resonant frequency of the tuned circuit (a Mark signal) the two grids operate in an alternate manner to keep the flow of anode current cut off at all times.

The output voltage of the tube 109 is applied to the control grid of the output keyer tube 112 through a resistive coupling network including a potentiometer 113 and resistor 114, connected to the receiver muting lead 24 from the party line keying circuit 21. The lead 24 is connected through a second pair of contacts 116, 117 of the party line keying circuit relay 91 to a negative 150 volt source of potential. The anode 118 is connected through the receiver telegraph relay control winding 51 and load resistor 119 to a positive 110 volt supply. A capacitor 121, interposed between the anode of the tube 109 and ground, serves to filter the audio carrier frequency from the low frequency telegraph signal.

With the party line keying circuit relay 91 energized (to close the contacts 116, 117 and thereby complete the connection of the coupling circuit comprising resistors 113 and 114 to the negative supply potential) it will be apparent that the receiver circuit will effect the actuation of the telegraph relay 33 when an incoming signal is a Mark signal. With a Space signal input, the keying tube 112 is cut off and the relay 33 deenergized. In order to provide a continuous Mark-Hold signal output (relay 33 energized) when no input signal is applied to the receiver input terminals, the resistor 122 in the cathode circuit of the discriminator tube 109 is adjusted to a value such that the current through the screen grid of the said tube 109, its series resistor 123, and the voltage dropping resistor 124 will completely block conduction of the tube, thereby removing the normal negative bias of about 30 volts, due to the connection through the resistors 113, 114 with the voltage supply, and apply a positive signal to the control grid of the keying tube 112 resulting in the energization of the relay control winding 51. A more detailed description of the receiver circuit discriminator operation is given in E. A. Gilbert Patent No. 2,844,720, dated July 22, 1958.

As mentioned above, when the adjacent transmitter is not transmitting, the party line keying circuit relay 91 is energized, and is deenergized during actuation of the key board of the adjacent teleprinter. It will be understood, then, that the negative 150 volt supply is connected to the lead 24 during stand-by condition and also while the receiver is receiving signals being sent by a remote station. The negative 150 volt supply is removed from the lead 24 by opening of the party line circuit relay contacts 116, 117 during key board operation of the adjacent teleprinter to, thereby, mute the receiver (i.e., maintain the receiver relay contacts 31, 32 closed in Mark condition). It will be understood, then, that the receiver relay is muted during transmission by the adjacent transmitter (and for a short time interval after the last character has been typed on the adjacent key board) and is responsive at all other times to the remote transitters in the party line system.

Our novel party line keying circuit 21 for effecting the above-described transmitter carrier keying and receiver muting functions is provided, as seen in FIGURE 3, with a telegraph signal input from the teleprinter D.-C. loop circuit through the lead wire 22 and a large coupling capacitor 131. The party line keying circuit includes a diode 132 having a cathode 133 connected to the junction between a pair of series connected voltage dividing resistors 135 and 136, which resistors are connected between a positive 150 volt supply source and ground. The diode anode 137 is directly connected to the grid 138 of a triode electron keying tube 139. A time delay network 141, comprising a shunt connected capacitor 142 and variable resistor 143, is connected between the grid 138 and ground and serves to maintain a negative bias on the grid 138 for a short time interval after the diode 132 has been cut off. The cathode 144 of the tube 139 is connected directly to ground potential, while the anode 146 is connected through the party line keying circuit relay control winding 147 to the positive 150 volt supply.

In operation, the diode 132 is cut off by the positive supply potential applied to the cathode thereof through the resistor 135 during steady state, or non-keyed conditions, and no D.-C. output is developed across the said diode. Under these conditions, the bias on the grid of the triode tube 139 is such that this tube is conducting heavily, and the anode circuit relay 91 is energized. As described above, when the relay 91 is energized, the positive 150 volt anode voltage is disconnected from the transmitter buffer amplifier 43 thereby removing the transmitter carrier from the line; the diode 84 in its non-conducting condition acting as a high impedance to prevent oscillator feed through to the line through the electrode capacitors of the tube 76 in the buffer amplifier. Also, as described above, when the relay 91 is energized, the negative 150 volt supply is connected to the resistive coupling network between the receiver discriminator tube 109 and keyer tube 112, whereby the receiver keyer tube is in condition to respond to output signals from the discriminator.

Upon actuation of a key of the teleprinter key board 17, the normally-closed key board contacts are opened and the point designated 73 in the D.-C. teleprinter loop changes from a positive potential (substantially the potential of the battery 26) to a large negative potential resulting from the connection of the negative 150 volt source to the point 73 through the resistors 61 and 62. The negative pulse keys the transmitter, in the manner described hereinabove, and is applied to the cathode 133 of the rectifier 132 through the capacitor 131 whereupon the diode conducts. With the diode conducting, the large negative potential is connected therethrough and applied to the grid 138 of the tube 139 causing the tube 139 to cut off immediately. The plate circuit relay, or control member, 91 is thereupon deenergized and the positive 150 volt supply is connected to the anode of the buffer amplifier 76 through the normally-closed relay contacts 88, 89. Under these conditions, the oscillator carrier signal is available at the line 12, and the carrier is said to be on the line. It will be apparent that the conduction of the diode 132 responds to the signal pulses from the D.-C. teleprinter loop. Since it is necessary, however, to continuously mute the receiver and to provide carrier signals to the line 12 during continuous keyboard operation, the tube 139 and the plate circuit relay thereof must not respond to the keying pulses through the diode 132 except at the initiation and termination of the keyboard operation. To this end, the shunt connected capacitor 142 and resistor 143 are included in the coupling circuit between the diode 132 and triode 139. It will be noted, then, that while the teleprinter keyboard is not being operated, the capacitor 142 is in a state of discharge. When the teleprinter keyboard is operated, the initial negative pulse from the teleprinter loop charges the capacitor 142 to a sufficiently large negative potential to cut off the tube 139. Subsequent negative pulses from the teleprinter loop maintain the charge on the capacitor and the capacitor, in turn, maintains a negative potential on the grid 138 during periods that the diode 132 is non-conducting. The tube 139 is, therefore, maintained in non-conducting condition during continuous keyboard operation and for a short time interval thereafter. The discharge time of the capacitor may be varied by adjusting the shunt variable resistor 143, and is made sufficiently long (up to about 1 second, maximum) to prevent the relay 91 from following the keying pulses during transmission of a message.

As mentioned above, the receiver muting function is unnecessary in a party line arrangement wherein the communication link is maintained on a four-wire basis, as in a microwave system, since the receiver input and transmitter output are isolated from each other. The party line keying circuit may still be used, however, to key the transmitter carrier frequency without use of the receiver muting contacts. In such an arrangement, the lead 24 is connected directly to a negative 150 volt supply whereby the receiver is always maintained in an operational state, or condition. The normally open contacts 116, 117 of the relay are not utilized and a relay having only one set of contacts (88, 89) is necessary.

Having now described our invention in detail, in accordance with the requirements of the patent statutes, various other changes and modifications will suggest themselves to those skilled in this art. For example, the invention is not limited to the particular transmitter or receiver illustrated in the drawings. Further, the relay contacts of the party line keying circuit relay 91 may be included in different transmitter and receiver circuits to effect the carrier keying and receiver muting functions by means other than those illustrated in the drawings. For example, the transmitter carrier may be removed from the line by breaking the 108 volt supply to the anode of the oscillator tube 72 thereby disabling the oscillator during periods that the teleprinter keys are not actuated, i.e. stand-by periods and during receipt of signals from remote transmitters. Similarly, receiver muting may be effected by breaking other suitable receiver connections by the contacts of the relay 91 during transmission of signals by the adjacent transmitters. It will further be understood that the invention is not limited to the particular transmitter and receiver circuits shown in detail in FIGURE 3. For example, a receiver which does not include a relay 33 may be employed if the output keyer 49 is of a suitable design. Thus, it will be understood that the circuit shown in block diagram form in FIGURE 2 will function satisfactorily without the use of the relay 33 by direct coupling of the output keyer 49 to the D.-C. telegraph loop providing, of course, that a suitable output keyer circuit is employed. (Such a receiver circuit, which does not include a relay, is shown, for example, in patent application Serial No. 615,376 of George L. King, filed October 11, 1956, and now Patent No. 2,919,301, dated December 29, 1959, entitled, Teleprinter System.) With this arrangement, half duplex party line facilities are provided on an all electronic basis, with respect to the transmitter and receiver circuits. It is intended that such changes and modifications shall fall within the spirit and scope of the invention as received in the following claims.

We claim:

1. In an alternating current telegraph system, a transmitter comprising a continuously operating source of marking and spacing signal frequencies, a normally disabled means connecting the transmitter to a communication link, a telegraph signal generator controlling the said source of signal frequencies, and keying means connected to and controlled by the said telegraph signal generator, and means connecting the keying means to the said normally disabled connecting means, the said keying means enabling the said normally disabled connecting means during operation of the telegraph signal generator.

2. The invention as recited in claim 1 including means for delaying the redisablement of the said connecting means for a period of time after termination of operation of the said telegraph signal generator.

3. The invention as recited in claim 1 including a normally non-conducting blocking diode in series connection between the transmitter and communication link to prevent signal frequency transmission to the communication link through the said connecting means when the connecting means is disabled.

4. The invention as recited in claim 1 wherein the said keying means comprises a normally conducting electron device including an input electrode and an output electrode, a normally non-conducting diode, a coupling capacitor, the said normally non-conducting diode and coupling capacitor connecting the said telegraph signal generator to the said input electrode of the electron device, a delay circuit connected to the said input electrode, a control device connected to the output electrode of the said electron device and energized when the said electron device is conducting, means connecting an enabling source of potential to the said connecting means through the said control device for enabling the connecting means during the generation of telegraph signals by the telegraph signal generating means, the said delay circuit including a shunt connected capacitor and resistor, the said capacitor charging through the said normally non-conducting diode and discharging through the shunt resistor to maintain a cut-off bias on the input electrode of the said electron device for an interval of time after operation of the telegraph signal generating means is stopped.

5. In an alternating current telegraph system, a transmitter comprising a continuously operating source of marking and spacing signal frequencies, a telegraph signal generator for controlling the said source of signal frequencies, a normally responsive signal frequency receiver, a selector magnet connected to the output of the said signal frequency receiver and energized in correspondence with voltage pulses produced in the said receiver, means connecting the selector magnet in series circuit with the said telegraph signal generator, the said selector magnet also being energized in correspondence with voltage pulses produced by the said generator, keying means connected to the said telegraph signal generator and controlled thereby, means connecting the keying means to the receiver, the said keying means muting the said receiver during generation of telegraph signals by the said telegraph signal generator.

6. The invention as recited in claim 5 including means for delaying the return of the receiver to the normal responsive condition for a period of time after the generation of telegraph signals is stopped.

7. In an alternating current telegraph system, a transmitter comprising a continuously operative source of marking and spacing signal frequencies, a normally disabled means connecting the transmitter to a communication link, a normally responsive signal frequency receiver connected to the communication link, a telegraph signal generator for controlling the said source of signal frequencies, and a transmitter keying and receiver muting circuit connected to the said telegraph signal generator and enabling the said normally disabled connecting means and muting the receiver during generation of telegraph signals by the said telegraph signal generator and for a short time interval after generation of telegraph signals is stopped.

8. The invention as recited in claim 7 including a normally non-conducting blocking diode in series connection between the transmitter and communication link to prevent signal frequency transmission to the communication link through the said connecting means when the connecting means is disabled.

9. In an alternating current telegraph system, a transmitter comprising a source of marking and spacing signal frequencies, a telegraph signal generator comprising a finger operable keyboard which includes a normally closed keyboard contact adapted to be opened upon actuation of any key of the keyboard and a series connected D.-C. voltage source, a normally disabled amplifier connecting the said transmitter to a communication link, a telegraph selector magnet in series circuit with the said D.-C. voltage source and the keyboard contact, a signal frequency receiver having an input connected to the communication link, a control device having an input and output circuit, the input circuit of the control device being connected to the receiver output and the control device output being connected in a D.-C. telegraph loop circuit including the said series connected keyboard contact, D.-C. voltage source, and telegraph selector magnet, the said telegraph selector magnet being energized and deenergized in correspondence with actuation of the keyboard contact and in correspondence with the condition of the receiver control device output circuit, a party line keying and receiver muting circuit responsive to actuation of the keyboard contact, the last-mentioned circuit means maintaining the receiver control device output circuit closed and also enabling the normally disabled amplifier during operation of the finger operable keyboard and for a short time interval after operation of the keyboard is stopped.

References Cited in the file of this patent

FOREIGN PATENTS 572,283 Canada ---------------- Mar. 17, 1957